United States Patent [19]
Hirata

[11] 3,714,345
[45] Jan. 30, 1973

[54] STABILIZED ERYTHROCYEES AND METHODS THEREFORE

[75] Inventor: Arthur Atsunobu Hirata, Waukegan, Ill.

[73] Assignee: Abbott Laboratories, North Chicago, Ill.

[22] Filed: Feb. 22, 1971

[21] Appl. No.: 117,790

Related U.S. Application Data

[63] Continuation-in-part of Ser. No. 760,052, Sept. 16, 1968, abandoned, which is a continuation-in-part of Ser. No. 682,550, Nov. 13, 1967, abandoned.

[52] U.S. Cl. .........................424/3, 424/11, 424/12, 424/13, 252/408
[51] Int. Cl. ......A01n 1/00, G01n 31/00, G01n 33/16
[58] Field of Search .........424/3, 12, 11, 13; 252/408

[56] References Cited

UNITED STATES PATENTS 3,057,775  10/1962  Rendon..............................424/3 UR

OTHER PUBLICATIONS

Ling, Brit. J. Haemat. Vol. 7, 1961 pp 299–302
Kabat, Exptl. Immunochem. CC Thomas, Springfield Ill 2nd Ed. 1961 pp 542–550
Chem Abs. Vol. 55 (1961) p 27495; Vol. 65 (1966) pp 20497, 20672
Ingraham, PSEBM, Vol. 99, Nov. 1958, pp 452–56

*Primary Examiner*—Albert T. Meyers
*Assistant Examiner*—A. P. Fagelman
*Attorney*—Robert L. Niblack

[57] ABSTRACT

A method for obtaining an improved aldehyde-treated erythrocyte preparation having an increased hemagglutination titer. The erythrocytes are stabilized by sequential exposure to dilute solutions of pyruvic aldehyde and formaldehyde.

5 Claims, No Drawings

STABILIZED ERYTHROCYEES AND METHODS THEREFORE

CROSS-REFERENCE TO RELATED APPLICATIONS

This application is a continuation-in-part of copending U.S. Ser. No. 760,052, filed Sept. 16, 1968, now abandoned, which is a continuation-in-part of Ser. No. 682,550, filed Nov. 13, 1967, now abandoned.

DETAILED DESCRIPTION OF THE INVENTION

This invention relates to a test preparation in which erythrocytes for direct hemagglutination testing are provided which have increased activity and greatly improved storage stability. It further relates to a test preparation in which coated erythrocytes for indirect or passive hemagglutination testing are provided with enhanced activity and very superior storage stability. It further provides a method for treating the erythrocytes to impart thereto these beneficial properties.

Native erythrocytes and those treated by prior art procedures useful for direct hemagglutination testing such as blood typing suffer from the disadvantage that they deteriorate rapidly on storage so that for many purposes they are useless after about 21 days. Moreover, native cells are not susceptible to freeze-storage except in special media, nor are they satisfactory after being lyophilized and reconstituted. Native erythrocytes also are sensitive to the ionic composition, pH and osmotic pressure of the suspending media, so that there exist undesirable restrictions on the scope of the tests which may be performed with them.

Erythrocytes which are coated with known antigens are a recognized preparation for use as a testing means for antibodies specific to such antigens. When an antiserum or a serum containing the suspected antibody is brought into contact with the coated erythrocytes, agglutination or clumping results which is an index that the suspected antibody is actually present in the serum. It is known in the art that such agglutination provides semi-quantitative information as to the presence and occurrence of specific antibodies and also useful information as to conditions which give rise to the presence of such antibodies.

Many problems have been encountered in preparation, storage and use of such coated erythrocytes. For example, to overcome coating problems during preparation, the art has employed coupling agents to apply antigens to the erythrocytes. The problems may also relate generally to the stability of the erythrocytes under storage conditions to their sensitivity in selected passive hemagglutination tests and to the reproducability of such hemagglutination testing. Moreover, the individual erythrocyte cells may clump or exhibit non-specific hemagglutination, an activity which interferes with hemagglutination testing for a specific factor. Coated erythrocytes are ordinarily stored in a frozen condition, but when frozen preparations are thawed, clumping may occur or the cells may be destroyed by hemolysis.

It is desirable that erythrocytes be treated so that a variety of antigens may be coated thereon, and that such coated erythrocytes may be usefully employed as a sensitive reagent for passive hamagglutination, the testing of which is reliable and reproductable. It is also desirable to obtain antigen adsorption without requiring the presence of coupling agents or other involved steps.

It is accordingly one object of this invention to provide an erythrocyte preparation which has been treated so that it can be stored for extended periods without resulting in any hemolysis or clumping of the cells. It is a further object to provide an erythrocyte preparation useful for direct hemagglutination testing.

A further object of this invention is the provision of a method of treating erythrocytes to impart storage stability thereto while maintaining the combining sites in active condition.

Another important object of this invention is an erythrocyte preparation of the foregoing type which can be effectively coated with various antigens, and which coated erythrocytes comprise a preparation which can be effectively packaged and stored for extended periods until subjected to particular passive hemagglutination testing.

Still another important object of this invention is to provide a method for preparing stable and improved erythrocyte preparations of the type described; and for potentiating such preparations. The term potentiation refers to the conditioning of cells so as to increase the hemagglutination titer of the preparation.

In accordance with the foregoing objects as well as still other objects which will occur to practitioners, the invention is now described in detail in the following disclosure.

The following flow diagram may be referred to for a summary of the features encountered in the practice of the invention.

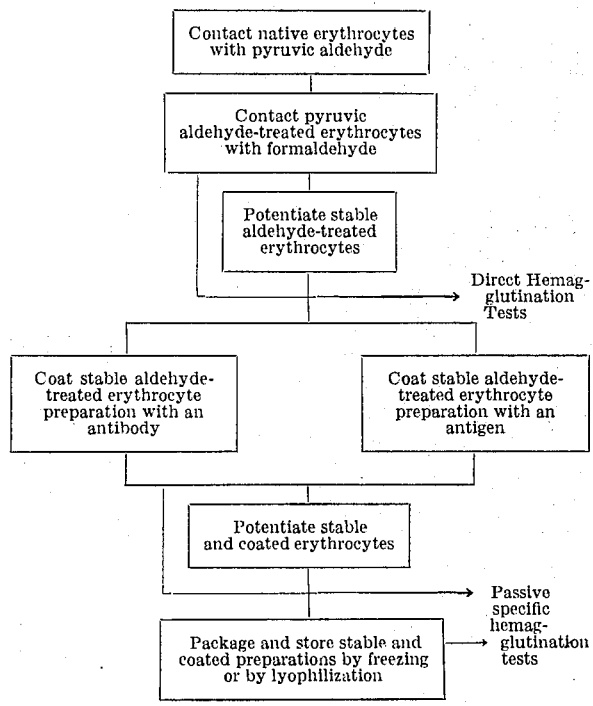

Native erythrocytes are collected in whole blood from various animals such as rabbits, rats, pigeons, sheep, chickens and humans. The blood sample is treated with conventional isotonic anticoagulant solutions, then the erythrocytes are packed as by centrifugation and washed with compatible buffer solutions having substantially neutral pH to prevent hemolysis of the erythrocytes and to remove undesirable materials which may be present on the erythrocytes from the serum.

A suspension of the washed erythrocytes is prepared in the neutral buffering solution in a minor concentration of preferably less than about 10% v/v. The erythrocytes are treated with a minor amount, preferably from 1.5 to 5.0 percent by volume of pyruvic aldehyde, relative to the volume of erythrocytes, for a time sufficient to impart desirability to the erythrocytes, preferably from 12 to 24 hours with mixing. Following the pyruvic aldehyde treatment step, the erythrocytes are washed several times to remove excess pyruvic aldehyde and any other materials which may have originated from the serum. The pyruvic aldehyde-treated erythrocytes are then exposed to a minor amount, preferably from 1.5 to 5.0 percent by volume, of formaldehyde relative to the volume of erythrocytes, for from about 12 to about 24 hours and the excess formaldehyde is removed by a plurality of washings with a buffered solution.

The foregoing pyruvic aldehyde and formaldehyde treatments may be collectively referred to as a "double aldehyde treatment" to attain a "stabilized erythrocyte preparation." It is an important and preferred feature of this invention that the pyruvic aldehyde treatment precede the formaldehyde treatment because it has been found that with many erythrocytes an initial formaldehyde treatment will tend to damage such cells; the preferred sequence is, therefore, recommended as the usual practice. It is understood, however, that with some erythrocytes, an initial formaldehyde treatment may not be particularly contraindicated and, therefore, in some practices an initial formaldehyde treatment might still lead to advantageous results if such a sequence is preferred.

Stabilized erythrocyte preparations may be stored for substantial periods without undesirable hemolysis, clumping, or other occurrence of objectionable features.

Human erythrocytes can be stabilized by pyruvic aldehyde-formaldehyde treatment without apparent alteration in their capacity to react with blood typing antisera. Stabilized human type A, B or AB cells were agglutinated specifically by anti-A or anti-B serum. The sensitivity of the agglutination reaction using the stabilized cells was equal to or several fold higher than that using the native cells. Stabilized type O cells did not react with anti-A or anti-B serum. The above reactivities were retained for several months when the cells were stored at 4°C or in freeze-storage. These stabilized cell preparations are useful as reference cells for blood typing.

The foregoing stable erythrocyte preparation may be converted to a coated stable erythrocyte preparation by contacting a sample of the aldehyde-treated erythrocytes with an antigen, followed by one or more washing steps to remove access antigen. In general, the stabilized erythrocytes are coated with antigens in a solution buffered to a pH below 7 and desirably buffered to a pH from about 3.6 to about 6. For polysaccharide antigens such as E. coli endotoxin, coating can be performed at pH 7. Superior sensitivity results when the treated erythrocytes are conditioned by agitating them in the buffered solution for about 1 hour prior to coating with antigen. The coating step is usually completed in about 1 hour, but some coatings may require as long as 24 hours. A coating temperature of 24°C is preferred; temperatures of 50°C and higher produce erythrocyte preparations of reduced sensitivity.

These foregoing conditions may vary somewhat for different antigens, but the practitioner may readily determine the preferred coating conditions by reference to agglutination occurrence with serial dilutions of a selected antiserum. For example, a rabbit may be injected with various amounts of antigen which is identical to the antigen adsorbed on the erythrocyte preparation. A serum sample would be collected in which the antibodies would be present, and serial dilutions of this serum could be placed in V-bottom plastic trays to which an equal volume of the stable aldehyde-treated erythrocyte preparation would be added. A reaction mixture containing cells and diluent serves as a control in which the cells form a "button" at the bottom, a negative reaction. The appearance of a "matted surface" would be a positive reaction of agglutination which is indicative of satisfactory coating. Non-specific agglutination must be carefully distinguished.

When reference is made herein to "antigen" coating, such term should be construed as denoting a material which may be an antibody or an antigen unless particular reference is made to specific antigens or antibodies.

Representative antigens which may be successfully used to coat the stabilized erythrocyte preparations include protein antigens such as bovine serum albumin or BSA, insolubilized BSA, human serum albumin, rabbit γ-globulin, human γ-globulin, streptococcal M protein, ragweed antigen "E", polysaccharide antigens such as E. coli endotoxin (ET), acetylated ET, succinylated ET, de-esterified ET, de-esterified and bromacetylated ET, synthetic polyglucose, miscellaneous antigens such as RNA-bacteriophage (Ribonucleic acid), QB, *Entamoeba histolytica* antigen and still others. It is a particular advantage of this invention that the stabilized erythrocyte preparation is suitable for coating with such a variety of substances with diverse chemical compositions.

In one embodiment of the potentiating step of this invention, the hemagglutination titer of either the stabilized or the coated erythrocyte preparation may be increased by reducing its temperature to about −190°C and then maintaining it at a temperature several degrees below freezing, preferably at a uniformly maintained temperature and at about −20°C, for a period of about 16 weeks. Alternatively, an equally effective potentiation results within about 6 weeks by periodically raising the temperature of the stabilized or coated erythrocytes to 24°C for several hours and without agitation preferably at intervals of about 6 or 7 days. Cycles having a length of several hours to a few days were ineffective.

In another embodiment of the potentiating step, the erythrocytes were treated with a dilute solution of oxidizing agent, sodium periodate being a suitable reagent.

In still another embodiment of this invention the stabilized erythrocyte preparation may be potentiated by coating the cells thereof with fibrinogen prior to coating with the antigen. Bovine fibrinogen is a suitable potentiating agent.

The potentiated stabilized or coated erythrocyte preparation may be stored in a lyophilized state or at a temperature of about −190°C until needed for hemagglutination tests. The manner of performing these tests is well understood by those skilled in the art.

In general, an animal serum sample with the suspected antibody is combined with the coated erythrocyte in a liquid vehicle to determine if any agglutination occurs. Likewise, the stabilized erythrocyte preparations may be coated with a specific antibody so that in subsequent hemagglutination testing, the erythrocytes will agglutinate in the presence of a free specific antigen. Other varieties and modifications in the hemagglutination testing process will occur to practitioners and all such tests may practiced to advantage with the improved stable and coated erythrocyte preparations.

The passive hemagglutination test may be used to detect the presence of γ-globulin on the cells as in Coomb's test, detection of bacterial infection as in the presence of endotoxin antigen, detection of viral infection, the typing for histocompatibility, the detection of autoimmune diseases and other phenomena of this type. The coated and stable erythrocyte preparations may also be used as a testing reagent in chemical analyses to detect presence of antigen in a quantitative or semi-quantitative fashion.

The following examples are presented to teach various embodiments for practicing the invention, but while such embodiments include those best contemplated at present for practicing the invention, it should be understood that they do not represent exclusive embodiments. Neither do they necessarily include what may prove to be preferred forms in future practice.

EXAMPLE 1

Stable Aldehyde Treated Erythrocyte Preparation

A 20 ml. sample of whole blood is removed from a 2-3 kg. rabbit by cardiac puncture, and said sample is collected in a syringe containing an equal volume of sterile Alsever's solution. This solution is generally isotonic and contains a sodium citrate anticoaggulant, sodium chloride, dextrose and distilled water. The withdrawn sample is allowed to stand overnight at about 4°C, and it is then centrifuged at 1500 rpm. for 10 minutes to obtain about 10 ml. of packed rabbit erythrocytes. The packed erythrocytes are then combined with 10 volumes of a 0.11M phosphate buffer solution, pH 7.2. This buffered solution is prepared from monopotassium phosphate and disodium phosphate with vortex mixing. The mixture of erythrocyte and buffer solution is centrifuged and then subjected to five separate washings with 10 volumes of the foregoing buffered solution to remove serum protein and any other serum materials. The washed erythrocytes are then resuspended in the foregoing buffered solution to attain an 8% v/v rabbit erythrocyte suspension.

To a 500 ml. Erlenmeyer flask is added 125 ml. of the phosphate buffered solution containing 3 percent pyruvic aldehyde v/v and 125 ml. of the foregoing 8 percent erythrocyte suspension, and the mixture is stirred about 18 hours at room temperature. The mixture is then filtered through a gauze pad to remove any large debris and the erythrocytes are then washed on five separate occassions with 10 times their volume of the phosphate buffered solution. The pyruvic aldehyde treated erythrocyte preparation is then resuspended in the foregoing buffered solution in a 10 percent concentration v/v.

A 125 ml. volume of the foregoing pyruvic aldehyde treated suspension is diluted to 8 percent and mixed with 125 ml. of the phosphate buffered solution containing 3 percent formaldehyde v/v. The mixture is agitated overnight with a magnetic stirrer at room temperature, and the mixture is then filtered through a gauze pad to remove any possible debris. The pyruvic aldehyde and formaldehyde treated erythrocytes are then washed on five different occassions with 10 times their volume of the foregoing buffered solution. The aldehyde treated erythrocyte preparation is then resuspended as a 10 percent concentration in the foregoing buffered solution and transferred to glass containers and stoppered for storage. The foregoing aldehyde treated erythrocyte preparation is stable for at least 2 months at reduced temperatures of 4°C, or for indefinite periods frozen in liquid nitrogen.

The stabilized erythrocyte preparation may be potentiated, but in the preferred process the potentiation step is reserved until after the erythrocytes have been coated.

The stabilized erythrocyte preparation made according to the process of this invention possesses most, if not all of the combining sites present on the native erythrocyte, combining sites referring specifically to sites which may react with antibody or virus.

EXAMPLE 2

Potentiated Stabilized Erythrocyte Preparation

This example will illustrate the increase in hemagglutination titer achieved by attaching fibrinogen to the cells of the stabilized erythrocyte preparation. Bovine fibrinogen at a concentration of 1 microgram per milliliter in 0.1 M acetate buffered solution, pH 4.0, was heated at 60°C for one hour and cooled to room temperature. A 10 percent suspension of the double aldehyde treated erythrocytes obtained by the process of Example 1 were added to the fibrinogen solution and stirred for one hour at room temperature. The potentiated stabilized erythrocytes were washed with a phosphate buffer solution, pH 7.2, and the erythrocyte concentration adjusted to 10% v/v. These cells were later used with superior results for blood type determinations.

EXAMPLE 3

Potentiated, Stabilized, Coated, Erythrocyte Preparation

One milliliter of the 10 percent suspension of potentiated stabilized erythrocyte preparation obtained by the process of Example 2 was washed with a 0.1 M acetate buffer solution, pH 4.0, and resuspended in 9 milliliters of the acetate buffer solution at 24°C. One milliliter of the acetate buffer solution containing 1 milligram of BSA is added. The mixture was stirred at room temperature for 2 hours and then washed 5 times with an excess of phosphate buffered solution, pH 7.2. These cells were later used for passive hemagglutination reactions.

EXAMPLE 4

Antigen Coated Stabilized Erythrocyte Preparation

Into a 12 ml. conical centrifuge tube at 24°C is added 1 ml. of the 10 percent suspension of aldehyde treated erythrocyte preparation obtained by the process steps of Example 1. This sample is then washed with a 0.1 molar acetate buffer solution, pH 4.0. The stabilized erythrocytes are not hemolized or clumped by this lowered pH level. The washed erythrocyte preparation cells are resuspended in 9 ml. of the acetate buffered solution at 24°C, pH 4.0 and agitated at this pH and temperature for 1 hour; then 1 ml. of the acetate buffer solution containing 1 mg. of BSA is added. The mixture of antigen and stable aldehyde treated erythrocytes are rotated at room temperature for 2 hours and then subjected to 5 separate washings with excess volumes of a phosphate buffered solution, pH 7.2. The BSA coated stable erythrocytes are resuspended in the foregoing phosphate buffer at concentrations of 0.5% v/v, and 10 ml. aliquots of this suspension are packaged in 20 ml. glass bottles and stoppered. The packaged predetermined amount of the coated stable aldehyde treated erythrocyte preparation is then quick frozen in a liquid nitrogen freezer and stored at −20°C.

EXAMPLE 5

Potentiation of Coated Stable Erythrocyte Preparation

Treated erythrocytes, coated as in Example 4, but at a pH of 3.6, having been frozen at −196°C and stored at −20°C for 6 days, are thawed to room temperature of 24°C without agitation, maintained at 24°C for 2 hours, and after refreezing at −196°C, are returned to −20°C. The process is repeated once a week for 6 weeks.

The potentiated coated erythrocytes are then frozen at −196°C and stored at that temperature until needed for the hemagglutination test. Alternatively, the potentiated coated cell suspension can be lyophilized and reconstituted by adding water before use.

This process increases the titer 30-fold while only doubling the non-specific hemagglutination titer, a practically insignificant increase. Further repeated freeze-thaw cycles results in a further increase in hemagglutination titer but also produces a concurrent significant increase in the nonspecific hemagglutination titer, so that little advantage is realized from the extended processing.

The optimum number of freeze-thaw cycles is related to a specific coated cell preparation but the optimum will be recognized by those skilled in the art as occurring at that cycle beyond which the increase in hemagglutination titer is accompanied by an appreciable increase in the non-specific hemagglutination titer. A coated cell preparation which was optimal for the standard serum was found to be optimal also for other antisera. Thus, successive standard sera can be standardized against the original selected anti-serum.

EXAMPLE 6

Sensitivity of Erythrocyte Preparation Coated with Bovine Serum Albumin

Following the procedures of Examples 1 and 4, an erythrocyte preparation is obtained in which rabbit erythrocytes are coated with Bovine Serum Albumin (BSA). A related procedure is followed to coat another erythrocyte preparation with BSA, but the erythrocytes of this sample are stabilized only with pyruvic aldehyde and not with the aldehyde treatment sequence according to the disclosure of this invention. The hemagglutination titers of both preparations are compared in the following Table I to illustrate the greater sensitivity of the BSA coated erythrocyte preparation which has been stabilized with the double aldehyde treatment. Also illustrated are the results of the potentiation step.

EXAMPLE 7a

Potentiated Stabilized Erythrocyte Preparation

This example will illustrate still another embodiment of the potentiating step of this invention. Human erythrocytes were processed according to the procedure of Example 1 to obtain stabilized human erythrocytes suspended in a phosphate buffered solution, pH 7.2. The stabilized human erythrocytes were then treated at 24°C for 15 minutes with 0.00035M sodium periodate solution and then washed free of this reagent with phosphate buffered solution pH 7.2. When subjected to direct hemagglutination reaction against rat antiserum, the stabilized cells gave a reaction at dilution of 1 to 100 whereas the stabilized cells potentiated with the oxidation reaction exhibited hemagglutination at a dilution of 1 to 2,000.

EXAMPLE 7b

Potentiated, Stabilized Coated Erythrocyte Preparation

An antigen coated stabilized erythrocyte preparation obtained according to the process of Example 4 was treated as above with 0.00035 M sodium periodate for 15 minutes at 24°C. The potentiated stabilized erythrocytes were washed with a phosphate buffered solution pH 7.2 and found to have a hemagglutination titer of 1 to 2,400,000.

TABLE I
Comparison of Hemagglutination Reaction of Erythrocyte Preparations

| Coated Cells | Coating pH | Condition Duration (Hours) | Hemagglutination Titer |
|---|---|---|---|
| BSA-coated Pyruvic aldehyde treated erythrocytes | 4 | 2 | 1/2,048 |
| BSA-coated Pyruvic aldehyde and formaldehyde treated stabilized erythrocytes | 4 | 2 | 1/40,000 |
| BSA-coated Pyruvic aldehyde and formaldehyde treated stabilized erythrocytes after six cycles of freeze-thaw potentiation (Example 5) | 3.6 | 1 | 1/1,280,000 |
| BSA-coated, stabilized, oxidation potentiated, erythrocytes (Example 7b) | 4 | 2 | 1/2,400,000 |
| BSA coated, fibrinogen potentiated, stabilized erythrocytes (Example 3) | 4 | 2 | 1/2,400,000 |

EXAMPLE 8

Representative Variations in Conditions For Coating Aldehyde-Treated Erythrocyte Preparations with Various Antigens A number of representative antigens are selected for coating an erythrocyte preparation prepared according to the procedure set out in Example 1. The coating procedure of Example 4 is generally followed.

The following data illustrates recorded observations which are readily determined by skilled practitioners by noting the occurrence of positive agglutination with serial dilutions of rabbit serum as previously described.

| Antigens | Amount (mg./10 ml.) | pH | Duration Hours (at 24°C) |
| --- | --- | --- | --- |
| Bovine Serum Albumin (BSA) Insolubilized | 1.0 | 4 | 2 |
| BSA | 0.1 | 4 | 2 |
| Rabbit Globulin | 0.01 | 5 | 1/6 |
| Endotoxin and Derivatives | 0.01 | 7 | 1/2 |
| Polyglucose | 1.0 | 4 | 1/2 |
| Bacteriophage, Qβ | 0.3 | 5 | 4 |
| Sheep leutenizing hormone | 0.004 | 4 | 4 |
| Bovine Serum Albumin (BSA) | 1.0 | 4 | 1 * |
| Bovine Serum Albumin (BSA) | 1.0 | 3.6 | 1 ** |

\* Plus one hour agitation at pH 4 prior to antigen addition.
\*\* Plus one hour agitation at pH 3.6 prior to antigen addition.

The invention may now be practiced in the many various ways which occur to those skilled in this art, and all such modifications in practice will comprise a part of the concept behind the disclosed embodiments.

The invention is now defined by the terms of the following claims which are given further meaning by the language of the preceding description.

I claim:

1. A method for obtaining an improved aldehyde-treated erythrocyte preparation which is useful in passive hemagglutination procedures, said method comprising the steps of: preparing a suspension of washed erythrocytes in a neutral buffered solution; treating said erythrocyte suspension with from 1.5 to 5.0 percent by volume of pyruvic aldehyde per volume of erythrocytes for from 12 to 24 hours at room temperature; washing the pyruvic aldehyde-treated erythrocyte suspension with said buffered solution to remove the excess pyruvic aldehyde; treating the washed pyruvic aldehyde-treated erythrocyte suspension with from 1.5 to 5.0 percent by volume of formaldehyde per volume of erythrocytes for from 12 to 24 hours; and washing the resulting stabilized erythrocyte preparation with said buffered solution to remove the excess formaldehyde.

2. The method of claim 1 wherein said neutral buffered solution is a pH 7.0–7.2 phosphate solution.

3. The method of claim 2 additionally comprising the step of treating said stabilized erythrocyte preparation at about 24°C. for about 15 minutes with a 0.00035 M sodium periodate solution and then washing said preparation with said buffered solution to remove the oxidizing agent.

4. The stable erythrocyte preparation obtained by the method of claim 1.

5. The stable erythrocyte preparation of claim 4 in lyophilized form.

* * * * *